US009863122B2

(12) United States Patent
Soejima et al.

(10) Patent No.: US 9,863,122 B2
(45) Date of Patent: Jan. 9, 2018

(54) COOLING DEVICE AND CONSTRUCTION MACHINE

(71) Applicant: Komatsu Ltd., Minato-ku, Tokyo (JP)

(72) Inventors: Koji Soejima, Hitachinaka (JP); Yushi Tanaka, Hitachinaka (JP); Yuuki Ishikawa, Hitachinaka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 15/108,682

(22) PCT Filed: Mar. 31, 2016

(86) PCT No.: PCT/JP2016/060697
§ 371 (c)(1),
(2) Date: Jun. 28, 2016

(87) PCT Pub. No.: WO2017/168688
PCT Pub. Date: Oct. 5, 2017

(65) Prior Publication Data
US 2017/0284058 A1    Oct. 5, 2017

(51) Int. Cl.
*B60K 11/04*    (2006.01)
*B60K 11/00*    (2006.01)
(Continued)

(52) U.S. Cl.
CPC .............. *E02F 9/0866* (2013.01); *F01P 11/10* (2013.01); *B60K 11/04* (2013.01); *F01P 2001/005* (2013.01)

(58) Field of Classification Search
CPC ...... F01P 2060/02; B60K 11/00; B60K 11/04; E02F 9/0858; F02B 29/0418;
(Continued)

(56) References Cited

U.S. PATENT DOCUMENTS

2004/0020204 A1    2/2004   Callas et al.
2004/0040548 A1*   3/2004   Reuss .................. F02B 29/0412
                                                            123/563
(Continued)

FOREIGN PATENT DOCUMENTS

CN    101080558    11/2007
CN    104100356    10/2014
(Continued)

OTHER PUBLICATIONS

International Search Report in International Application No. PCT/JP2016/060597, dated Jun. 21, 2016, 8 pages, Japanese only.
(Continued)

*Primary Examiner* — Bryan Evans
(74) *Attorney, Agent, or Firm* — Fish & Richardson P.C.

(57) ABSTRACT

A cooling device includes: an introduction pipe configured to introduce a charge air supercharged by a supercharger; a first aftercooler connected to the introduction pipe and configured to cool the charge air; a branch pipe branched from the introduction pipe; a second aftercooler connected to the branch pipe and configured to cool the charge air; and a cooling fan configured to supply a cooling wind to the first aftercooler and the second aftercooler, in which the first aftercooler and the second aftercooler are disposed to be shifted from each other in a rotation axis direction of the cooling fan.

13 Claims, 6 Drawing Sheets

(51) Int. Cl.
*E02F 9/08* (2006.01)
*F01P 11/10* (2006.01)
*F01P 1/00* (2006.01)

(58) Field of Classification Search
CPC .............. F02B 29/0456; F02B 29/0493; F28D 1/0452; F28D 2021/0082
See application file for complete search history.

(56) References Cited

U.S. PATENT DOCUMENTS

| | | |
|---|---|---|
| 2004/0108097 A1 | 6/2004 | Ueda |
| 2005/0109483 A1 | 5/2005 | Kolb |
| 2007/0114004 A1 | 5/2007 | Kolb |
| 2012/0227943 A1 | 9/2012 | Nakashima |
| 2012/0234266 A1* | 9/2012 | Faulkner .................. F01P 7/165 123/41.1 |
| 2015/0034281 A1* | 2/2015 | Cummins ........... F02B 29/0456 165/121 |

FOREIGN PATENT DOCUMENTS

| | | |
|---|---|---|
| GB | 2502806 | 3/2004 |
| JP | H02-118138 | 5/1990 |
| JP | H04-262018 | 9/1992 |
| JP | 2003-049648 | 2/2003 |
| JP | 2004-092921 | 3/2004 |
| JP | 2005-126990 | 5/2005 |
| JP | A-2011-20590 | 2/2011 |
| JP | 2012-188931 | 10/2012 |
| JP | 2015-031509 | 2/2015 |

OTHER PUBLICATIONS

International Search Report in International Application No. PCT/JP2016/060697, dated Jun. 21, 2016, 8 pages, Japanese only.
Office Action issued in JP 2016-535199, dated Aug. 9, 2016, with English Translation, 5 pages.
Decision to Grant a Patent issued in JP 2016-535199 dated Jan. 12, 2017., with English Translation, 5 pages.
Office Action in corresponding Canadian Application No. 2,934,543, dated Apr. 21, 2017, 5 pages.
Office Action in corresponding Chinese Application No. 201680000537.5, dated Aug. 4, 2017, 9 pages, with English translation.

* cited by examiner

# COOLING DEVICE AND CONSTRUCTION MACHINE

CROSS-REFERENCE TO RELATED APPLICATIONS

This application claims priority to International Application No. PCT/JP2016/060697filed on Mar. 31, 2016, the contents of which are incorporated herein in their entirety.

TECHNICAL FIELD

The present invention relates to a cooling device and a construction machine.

BACKGROUND ART

In a typical construction machine, a cooling device provided with an aftercooler for cooling air charged into an engine has been known (see, for instance, Patent Literature 1).

CITATION LIST

Patent Literature(s)

Patent Literature 1: JP-A-2011-20590

SUMMARY OF INVENTION

Problems to be Solved by the Invention

However, since a typical cooling device as disclosed in Patent Literature 1 cools a charge air using a single aftercooler, a cooling performance may become insufficient when a charge temperature is increased due to, for instance, a further increase in a supercharging pressure. To cope with this, when a capacity of the aftercooler is increased in order to improve the cooling performance, a pressure loss to be generated in the aftercooler is increased.

An object of the invention is to provide a cooling device and a construction machine that are capable of improving a cooling performance to a charge air without increasing a pressure loss.

Means for Solving the Problems

According to an aspect of the invention, a cooling device includes: an introduction pipe configured to introduce a charge air supercharged by a supercharger; a first aftercooler connected to the introduction pipe and configured to cool the charge air; a branch pipe branched from the introduction pipe; a second aftercooler connected to the branch pipe and configured to cool the charge air; and a cooling fan configured to supply a cooling wind to the first aftercooler and the second aftercooler, in which the first aftercooler and the second aftercooler are disposed to be shifted from each other in a rotation axis direction of the cooling fan.

According to the above aspect of the invention, since the branch pipe branched from the introduction pipe configured to introduce the charge air to the first aftercooler is connected to the second aftercooler, the cooling performance can be enhanced without enlarging the aftercoolers and an increase in a pressure loss of the aftercoolers can be prevented. Moreover, since the first aftercooler and the second aftercooler are shifted from each other in the rotation axis direction of the cooling fan, such a piping structure that the branch pipe extends around the first aftercooler to connect to the second aftercooler is not required, so that the pressure loss caused by a curved pipe can be prevented. Accordingly, a cooling performance to a charge air can be improved without increasing the pressure loss.

With the above arrangement, it is preferable that the first aftercooler and the branch pipe are juxtaposed in the rotation axis direction of the cooling fan.

With the above arrangement, it is preferable that the introduction pipe and the branch pipe are disposed at substantially the same height.

With the above arrangement, it is preferable that the branch pipe includes a straight pipe extending in a direction of introducing the charge air to the second aftercooler to be connected to the second aftercooler.

It is preferable that the cooling device with the above arrangement further includes a discharge pipe connected to the first aftercooler and configured to discharge the charge air from the first aftercooler; and a joint pipe connecting the second aftercooler to the discharge pipe.

With the above arrangement, it is preferable that the discharge pipe and the second aftercooler are juxtaposed in the rotation axis direction of the cooling fan.

With the above arrangement, it is preferable that the discharge pipe and the joint pipe are disposed at substantially the same height.

With the above arrangement, it is preferable that the discharge pipe includes a straight pipe extending in a direction of discharging the charge air from the first aftercooler.

With the above arrangement, it is preferable that the first aftercooler and the second aftercooler are disposed to be shifted from each other in a direction perpendicular to the rotation axis direction of the cooling fan while respective ends of cores of the first aftercooler and second aftercooler are at the same line with reference to the rotation axis direction.

According to another aspect of the invention, a cooling device includes: a main pipe comprising an introduction pipe configured to introduce a charge air supercharged by a supercharger, a first aftercooler connected to the introduction pipe, and a discharge pipe configured to discharge the charge air from the first aftercooler; and a branch pipe including a branch pipe branched from the introduction pipe, a second aftercooler connected to the branch pipe, and a joint pipe connecting the second aftercooler to the discharge pipe.

With this arrangement, it is preferable that the main pipe further includes: a first T-pipe branched from the introduction pipe; a first elbow pipe configured to change a flow direction of the charge air from an introduction direction of the charge air by the introduction pipe to an introduction direction of the charge air by the first aftercooler; a second elbow pipe configured to change the flow direction of the charge air discharged from the first aftercooler from a discharge direction of the charge air by the first aftercooler to an opposite direction from the introduction direction by the introduction pipe; and a second T-pipe branched from the discharge pipe, in which the branch pipe connects the first T-pipe to the second T-pipe.

According to a still another aspect of the invention, a construction machine includes: an engine; and the cooling device according to any one of the above aspects of the invention.

DESCRIPTION OF EMBODIMENT(S)

An exemplary embodiment of the invention will be described below with reference to the drawings.

In a description below, directions of front, back (rear), right, left, top and bottom refer to those with reference to an operator sitting on an operator's seat in a cab 6 of a dump truck 1 (a construction machine) shown in FIG. 1. The right-left direction is identical with a vehicle-width direction of the dump truck 1. The top-bottom direction is identical with a vehicle-height direction of the dump truck 1.

Brief Structure of Dump Truck

Figure 1:
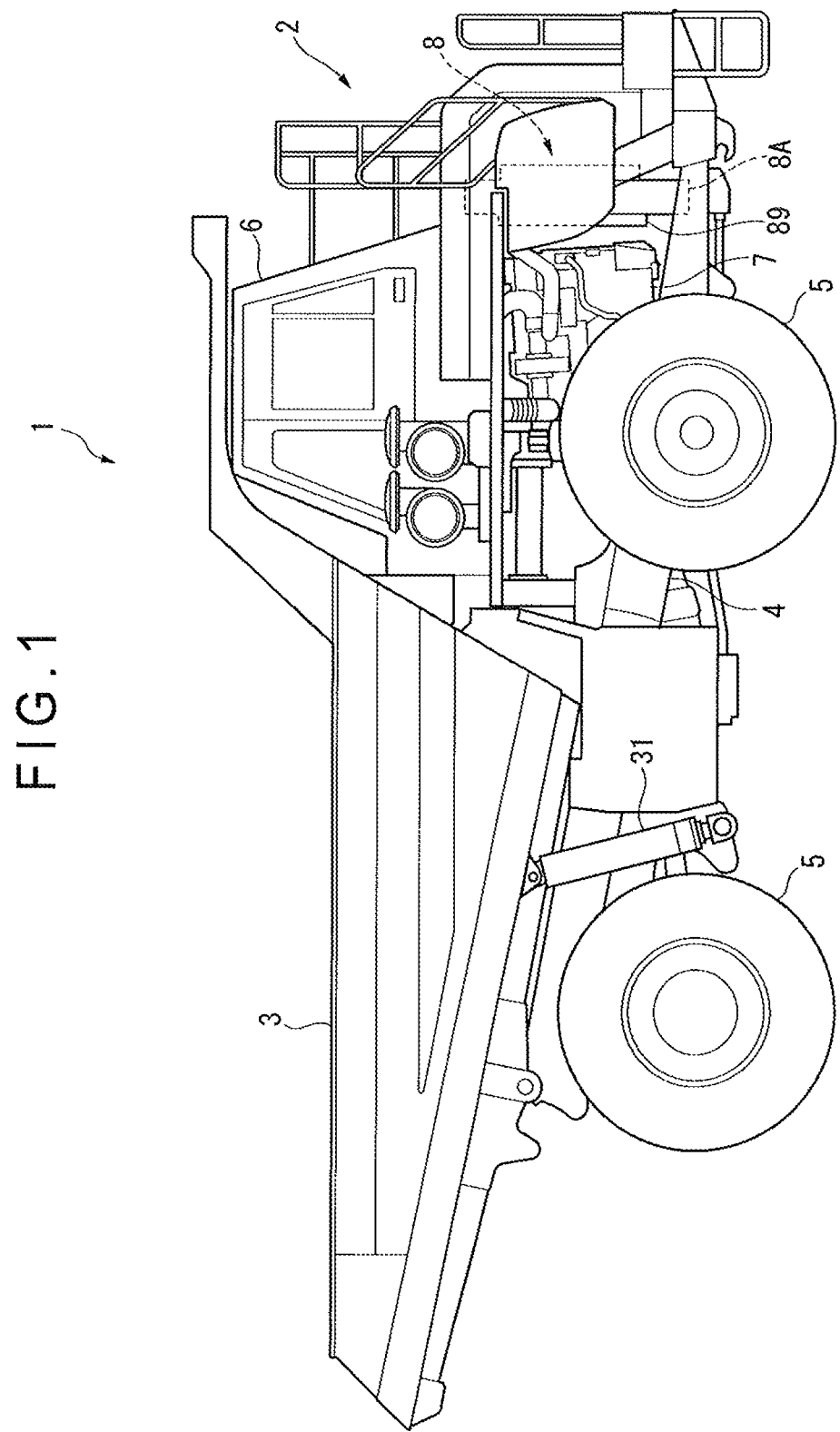
FIG. 1 is a side elevational view showing a construction machine according to an exemplary embodiment of the invention.`

As shown in FIG. 1, the dump truck 1 includes a chassis 2 and a dump body 3 supported on the chassis 2 and configured to be raised and lowered by a hoist cylinder 31. The chassis 2 includes: a frame 4; front and rear tires 5 supported on the frame 4 via a suspension (not shown); a cab 6 mounted near a left end of a front top of the frame 4; an engine 7 mounted at a front end of the frame 4; and a cooling device 8 mounted on the frame 4 in front of the engine 7.

Figure 2:
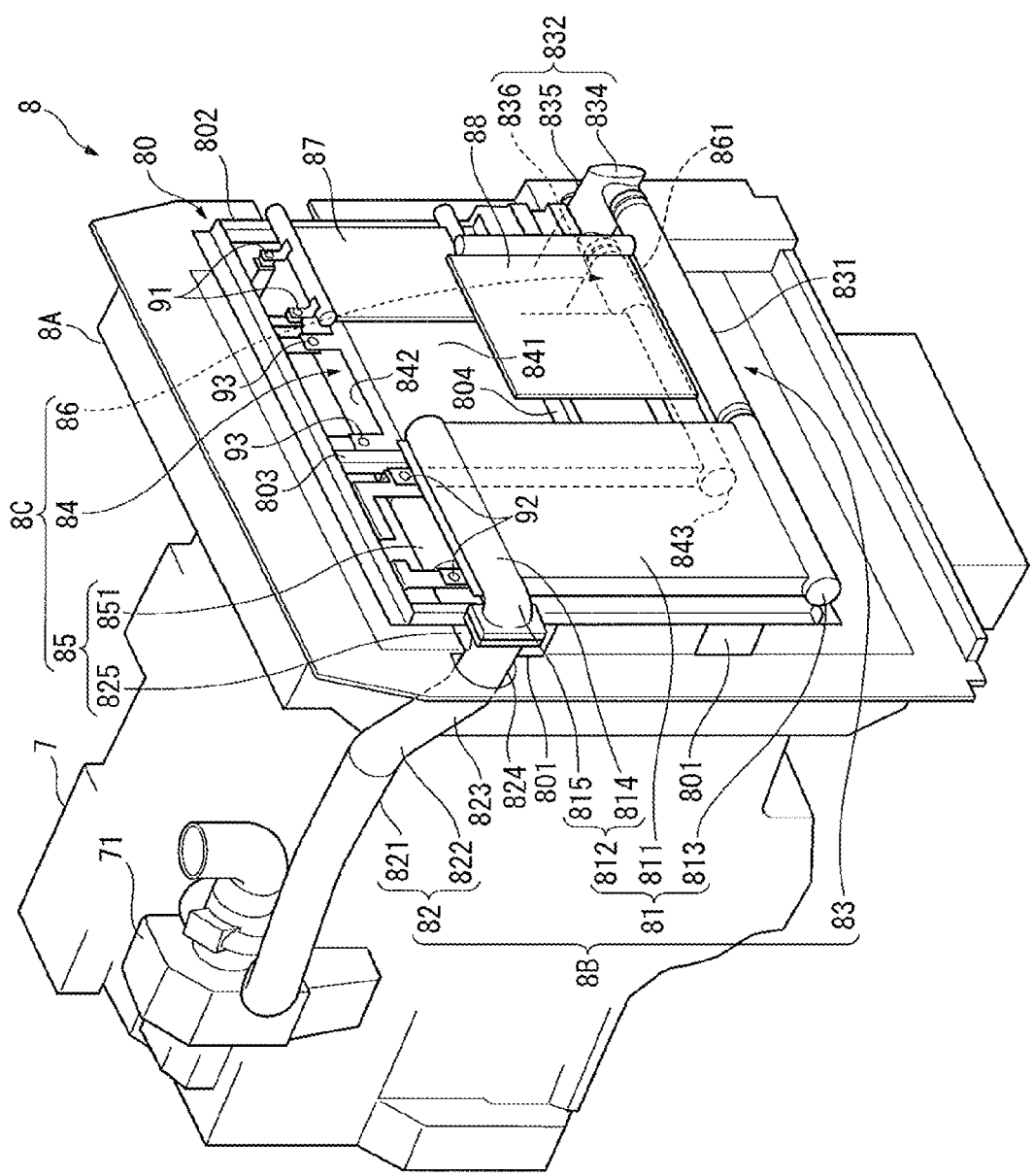
FIG. 2 is a perspective view showing a cooling device and an engine that are installed in the construction machine.

The engine 7, which is a diesel engine, is mounted on the frame 4 in a posture inclined upward in a front direction. As shown in FIG. 2, an exhaust turbocharger 71 (a supercharger) is installed in the engine 7.

Arrangement of Cooling Device

Figure 3:
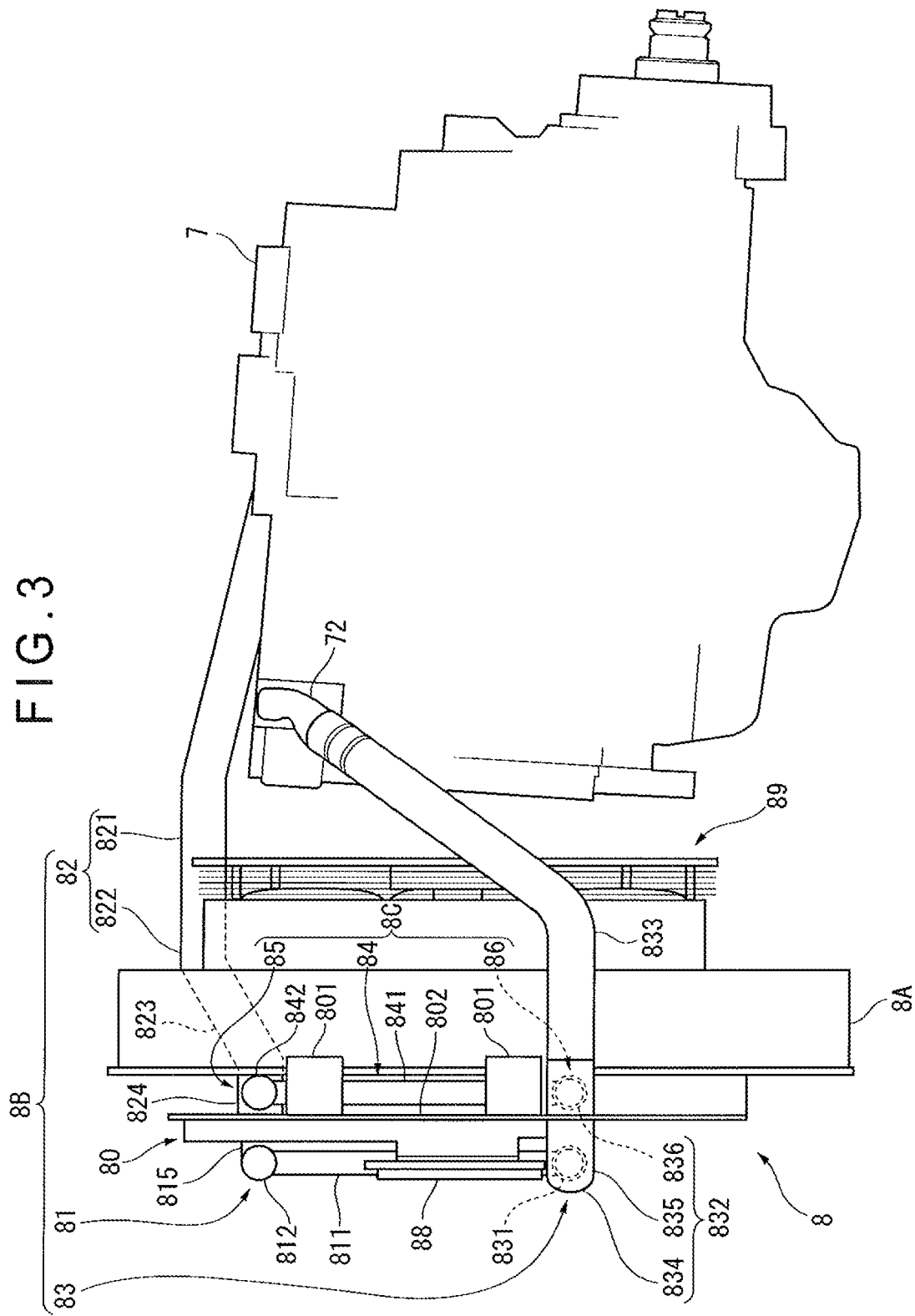
FIG. 3 is a side elevational view showing the cooling device and the engine.
Figure 4:
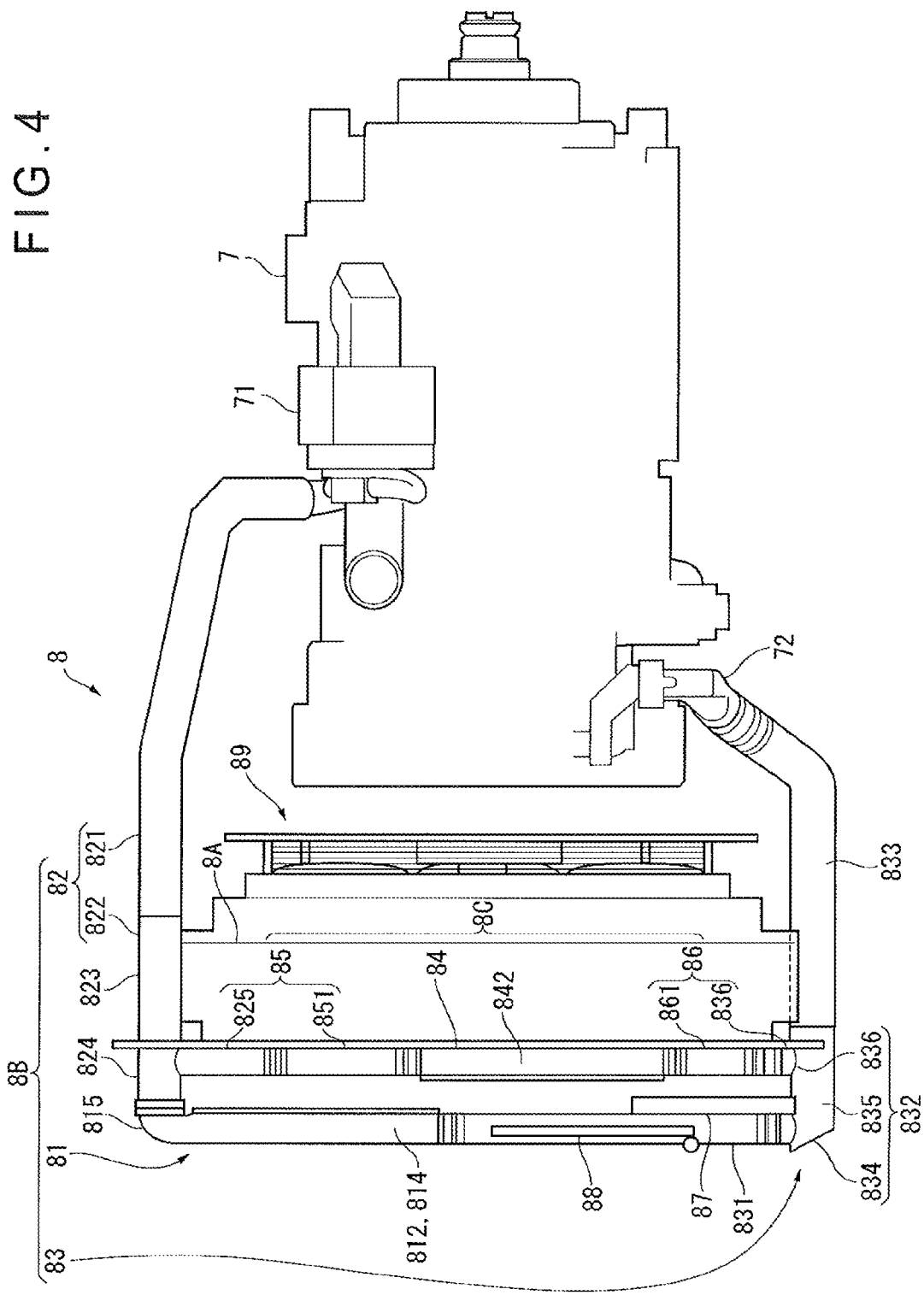
FIG. 4 is a plan view showing the cooling device and the engine.

As shown in FIGS. 2 to 4, the cooling device 8 is in a form of a unit in which a plurality of heat exchangers for cooling different to-be-cooled fluids are installed. The cooling device 8 includes: a radiator 8A configured to cool a cooling water of the engine 7; a first charge-air cooling path 8B (main pipe) configured to cool a charge air supercharged by the exhaust turbocharger 71 using a first aftercooler 81; a second charge-air cooling path 8C (branch pipe) configured to cool the charge air using a second aftercooler 84; a steering cooler 87 configured to cool a steering oil; an air-conditioner condenser 88 configured to cool a refrigerant of an air conditioner; and a cooling fan 89 (FIGS. 4 and 5) configured to generate a cooling wind.

As shown in FIG. 1, the radiator 8A is supported on the frame 4 while being vertically provided in front of the engine 7. A bracket 80 is attached to a front surface of the radiator 8A and supports the first aftercooler 81, the second aftercooler 84, the steering cooler 87 and the air-conditioner condenser 88.

The bracket 80 includes: stays 801 extending forward from right and left sides of the front surface of the radiator 8A; a rectangular frame 802 supported on the stays 801; a vertical member 803 extending in the top-bottom direction within the frame 802 to connect top and bottom bars of the frame 802; and a transverse member 804 extending in the left direction from the vertical member 803 to connect the vertical member 803 with a left vertical member of the frame 802.

The first charge air cooling path 8B includes: the first aftercooler 81; an introduction pipe 82 configured to introduce the charge air to the first aftercooler 81; and a discharge pipe 83 configured to discharge the charge air from the first aftercooler 81.

The second charge air cooling path 8C includes: the second aftercooler 84 connected to the first aftercooler 81 in parallel; a branch pipe 85 branched from the introduction pipe 82 and configured to introduce the charge air to the second aftercooler 84; and a joint pipe 86 connecting the second aftercooler 84 to the discharge pipe 83.

Figure 5:
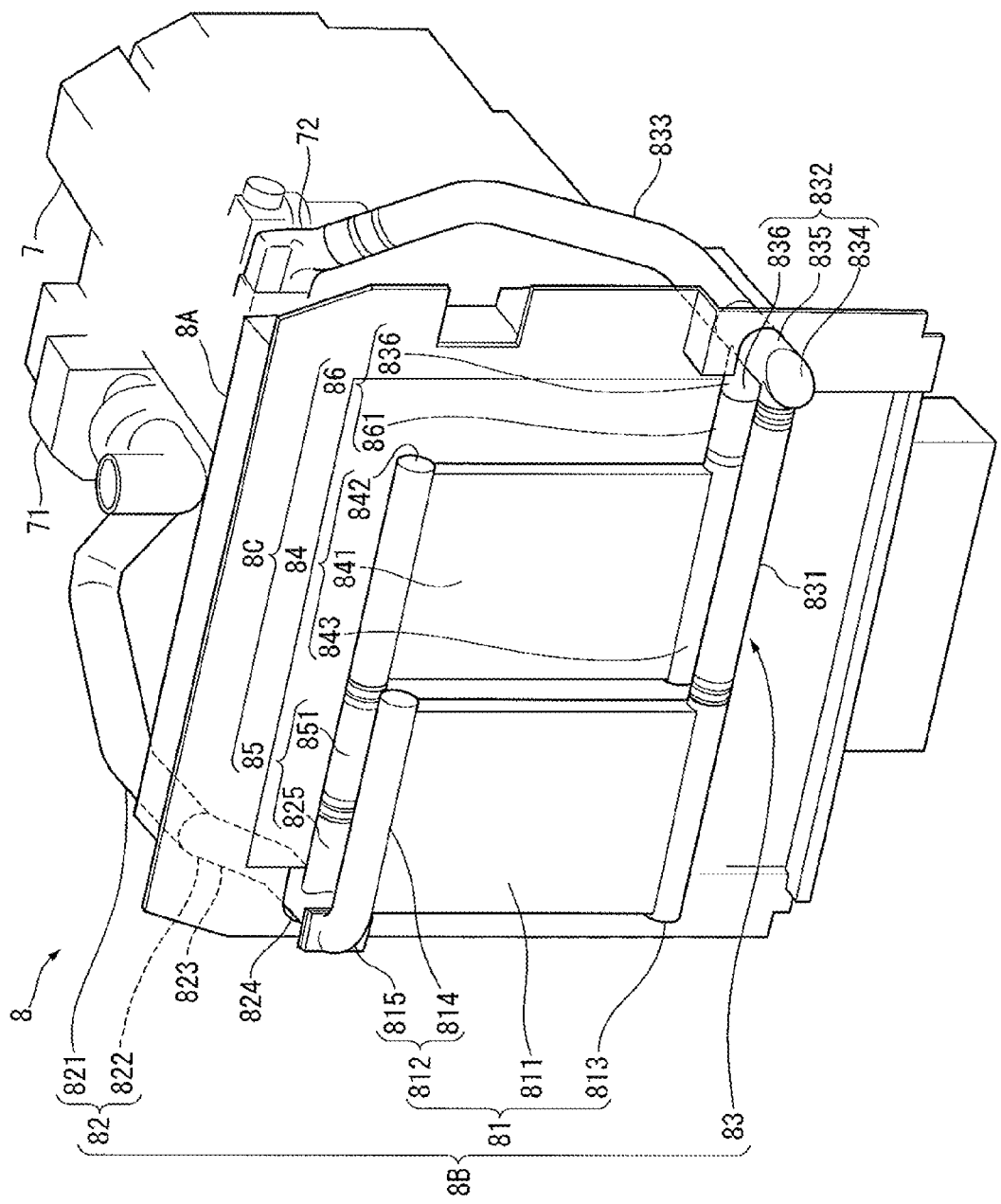
FIG. 5 is a perspective view showing the cooling device and the engine.

The first aftercooler 81 and the second aftercooler 84 are disposed to be shifted from each other in a rotation axis direction of the cooling fan 89 (i.e., the front-back direction) as shown in FIG. 5 in which components other than the cooling device 8 are not shown. Moreover, the aftercoolers 81 and 84 are disposed to be shifted from each other in a direction (i.e., the right-left direction) perpendicular to the rotation axis direction of the cooling fan 89. In the exemplary embodiment, the first aftercooler 81 is disposed at the front-right side of the radiator 8A and the second aftercooler 84 is disposed at the front-left side of the radiator 8A. The aftercoolers 81, 84 and the pipes 82, 83, 85, 86 will be described in detail later.

A central core of the steering cooler 87 is formed substantially rectangular in a plan view. The steering cooler 87 is disposed to the front-left side of the second aftercooler 84 in a vertically elongated manner (i.e., the longer sides of the core extend in the top-bottom direction) without covering the front side of the second aftercooler 84.

Moreover, top and left ends of the steering cooler 87 each are fixed to the frame 802 of the bracket 80 with a bolt 91 (FIG. 2) and a bottom end of the steering cooler 87 is fixed to the transverse member 804 with a bolt 91 (FIG. 2).

The air-conditioner condenser 88 includes a core formed substantially square in a plan view. The air-conditioner condenser 88 is disposed near a front-bottom side of the second aftercooler 84 and the steering cooler 87, so that the respective front sides of the coolers 84 and 87 are opened. Moreover, a right end of the air-conditioner condenser 88 is fixed to the vertical member 803 of the bracket 80 with a bolt (not shown) while a left end of the air-conditioner condenser 88 is fixed to the transverse member 804 with a bolt (not shown).

The cooling fan 89 is interposed between the engine 7 and the radiator 8A with the rotation axis oriented in the front-back direction. The cooling fan 89, which is a motor-driven or hydraulically driven suction fan, generates a cooling air and supplies the cooling air to the first aftercooler 81, the air-conditioner condenser 88, the steering cooler 87, the second aftercooler 84 and the radiator 8A, thereby supplying the cooling air to the engine 7.

Aftercooler and Piping Structure thereof

As shown in FIGS. 2 to 5, the first aftercooler 81 includes: a rectangular core 811 in a plan view; an inlet tank 812 extending along one of shorter sides of the core 811; and an outlet tank 813 extending along the other of the shorter sides of the core 811. The first aftercooler 81 is disposed in a vertically elongated manner at the front-right side of the radiator 8A (i.e., in a direction so that the longer sides of the core 811 extend in the top-bottom direction) with the top end and the bottom end fixed to the frame 802 of the bracket 80 using a bolt 92 (FIG. 2).

The core 811 includes therein a plurality of cooling pipes connecting the inlet tank 812 with the outlet tank 813.

The inlet tank 812 includes: a straight cylindrical portion 814 with a left end (a first axial end) closed; and an introduction elbow pipe 815 (a first elbow pipe) provided to a right end (a second axial end) of the cylindrical portion

814. The introduction elbow pipe 815 is curved backward from the cylindrical portion 814 to be connected to the introduction pipe 82 and changes a flow direction of the charge air from the introduction direction (i.e., the front direction) by the introduction pipe 82 to the charge air introduction direction (i.e., the left direction) of the first aftercooler 81.

The outlet tank 813 is formed in a straight cylinder with a right end closed and a left end connected to the discharge pipe 83.

The introduction pipe 82 connects the exhaust turbocharger 71 to the first aftercooler 81. The introduction pipe 82 includes: a first introduction pipe 821 connected to the exhaust turbocharger 71; and a second introduction pipe 822 connecting the first introduction pipe 821 with the first aftercooler 81.

The second introduction pipe 822 includes: an inclined pipe 823 that is inclined downward from the first introduction pipe 821; an introduction straight pipe 824 that extends forward from the inclined pipe 823; and an introduction branch pipe 825 (a first T-pipe) branched from the introduction straight pipe 824 in a direction perpendicular to an axial direction of the introduction straight pipe 824. The second introduction pipe 822 is provided along a right side of the radiator 8A and is connected to the introduction elbow pipe 815 of the first aftercooler 81 at the front-right side of the radiator 8A.

The discharge pipe 83 connects the first aftercooler 81 to an intake manifold 72 (FIG. 3) of the engine 7. The discharge pipe 83 includes: a first discharge pipe 831 connected to the first aftercooler 81; a second discharge pipe 832 that is connected to the first discharge pipe 831 and changes the flow direction of the discharged charge flow; and a third discharge pipe 833 (FIG. 3) that connects the second discharge pipe 832 to the intake manifold 72.

The first discharge pipe 831 is a straight pipe extending from the first aftercooler 81 in a direction of discharging the charge air. By providing the first discharge pipe 831 as a straight pipe, discharge resistance of the charge air from the first aftercooler 81 is reducible.

The second discharge pipe 832 is disposed at substantially the same height as the first discharge pipe 831. The second discharge pipe 832 includes: a discharge elbow pipe 834 (i.e., a second elbow pipe) connected to the first discharge pipe 831; a discharge straight pipe 835 extending from the discharge elbow pipe 834; and a discharge branch pipe 836 (i.e., second T-pipe) branched from the discharge straight pipe 835 in a direction perpendicular to an axial direction of the discharge straight pipe 835. The discharge elbow pipe 834 changes the flow direction of the charge air discharged from the first aftercooler 81 from the charge air discharge direction (i.e., the left direction) of the first aftercooler 81 to an opposite direction (i.e., the back direction) from the introduction direction by the introduction pipe 82.

The third discharge pipe 833 is connected to the second discharge pipe 832 on the left side of the radiator 8A. The third discharge pipe 833 linearly extends backward from a connection portion with the second discharge pipe 832 along the left side of the radiator 8A and then extends upward to be connected to the intake manifold 72.

The above first aftercooler 81, introduction pipe 82, and discharge pipe 83 define the main pipe for cooling the charge air supercharged by the exhaust turbocharger 71 and introducing the cooled charge air to the intake manifold 72. The first aftercooler 81 and the first discharge pipe 831 are flush with the air-conditioner condenser 88 on a vertical plane.

On the other hand, the second aftercooler 84, branch pipe 85, and joint pipe 86 define the branch pipe that is branched from the main pipe, cools the charge air and introduces the charge air to the intake manifold 72.

Although the second aftercooler 84 has substantially the same shape as the first aftercooler 81, the second aftercooler 84 is different from the first aftercooler 81 in that an inlet tank 842 is shaped in a straight cylinder having no curved portion. Specifically, the inlet tank 842 is shaped in a straight cylinder with a left end closed and a right end connected to the branch pipe 85. A description of a core 841 and an outlet tank 843 of the second aftercooler 84 (FIG. 2) will be omitted since the core 841 and the outlet tank 843 respectively have the same arrangements as the core 811 and the outlet tank 813 of the first aftercooler 81.

The second aftercooler 84 is disposed to be shifted backward from the first aftercooler 81, so that the inlet tank 842 can be linearly connected to the branch pipe 85. Moreover, the second aftercooler 84 is disposed so that the longer sides of the core 841 extend in the top-bottom direction at the front-left side of the radiator 8A and a right end of the core 841 is disposed at the same position as a left end of the core 811 of the first aftercooler 81 with reference to the rotation axis direction of the cooling fan 89. With this arrangement, the front side of the second aftercooler 84 is not covered with the first aftercooler 81. A top end and a bottom end of the second aftercooler 84 are fixed to the frame 802 of the bracket 80 with a bolt 93 (FIG.2).

The branch pipe 85 includes: an introduction branch pipe 825 of the second introduction pipe 822; and a branch connecting pipe 851 connecting the introduction branch pipe 825 to the second aftercooler 84.

The branch connecting pipe 851 is a straight pipe extending in a direction of introducing the charge air to the second aftercooler 84. By providing the branch connecting pipe 851 as a straight pipe, inflow resistance of the charge air to the second aftercooler 84 is reducible. The branch connecting pipe 851 is disposed at substantially the same height as the introduction branch pipe 825 of the second introduction pipe 822.

The joint pipe 86 includes: a discharge branch pipe 836 of the second discharge pipe 832; and a joint pipe 861 connecting the discharge branch pipe 836 to the second aftercooler 84. The joint pipe 86 is disposed at substantially the same height as the first discharge pipe 831 and the second discharge pipe 832.

The joint pipe 86 is a straight pipe extending in a direction of discharging the charge air from the second aftercooler 84. By providing the joint pipe 86 as a straight pipe, discharge resistance of the charge air from the second aftercooler 84 is reducible.

The above second aftercooler 84, branch pipe 85, and joint pipe 86 are provided flush with each other on a vertical plane while being disposed on a plane in parallel to a plane where the first aftercooler 81 and the first discharge pipe 831 are disposed. The inlet tanks 812 and 842 of the aftercoolers 81 and 84 are flush with the branch pipe 85 on a horizontal plane.

Further, the outlet tanks 813 and 843 of the aftercoolers 81 and 84, the first discharge pipe 831, the second discharge pipe 832, and the joint pipe 861 are flush with each other on a horizontal plane.

Advantage(s) of Embodiment(s)

According to the above exemplary embodiment, since the branch pipe 85 branched from the introduction pipe 82 configured to introduce the charge air to the first aftercooler 81 is connected to the second aftercooler 84, the cooling performance can be enhanced without enlarging the aftercoolers 81 and 84 and an increase in a pressure loss of the aftercoolers 81 and 84 can be prevented. Moreover, since the first aftercooler 81 and the second aftercooler 84 are shifted from each other in the rotation axis direction of the cooling fan 89, such a piping structure that the branch pipe 85 extends around the first aftercooler 81 to be connected to the second aftercooler 84 is not required, so that the pressure loss caused by a curved pipe can be prevented. Accordingly, a cooling performance to a charge air can be improved without increasing the pressure loss.

Modification(s)

The scope of the invention is not limited to the above-described embodiment, but includes modification(s) and improvement(s) as long as an object of the invention can be achieved.

Figure 6:
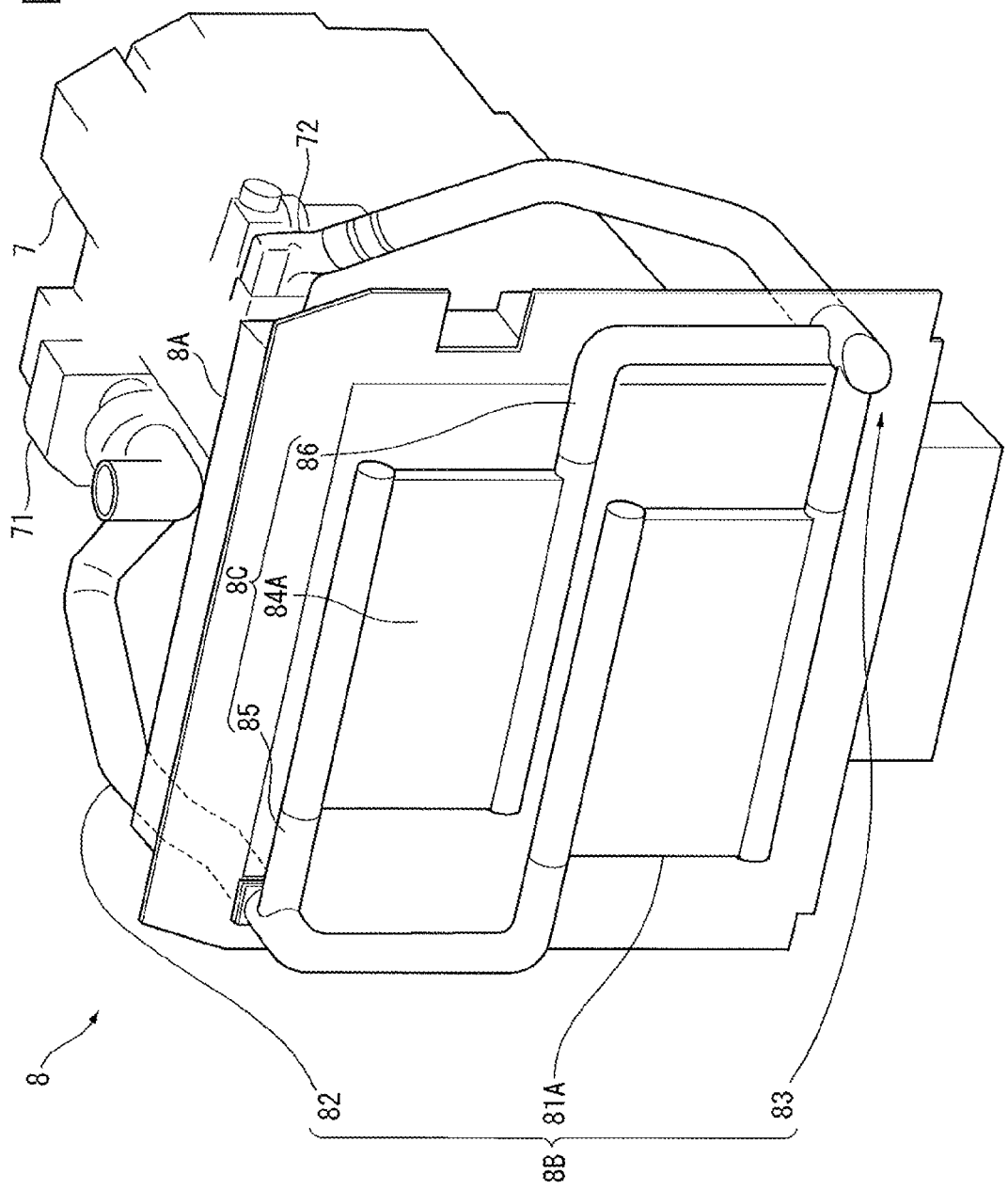
FIG. 6 is a perspective view showing a cooling device according to a modification of the invention.

For instance, as shown in FIG. 6, the first aftercooler 81A and the second aftercooler 84A may be disposed shifted from each other in a direction perpendicular to the rotation axis direction of the cooling fan 89 (i.e., the top-bottom direction).

The disposition of the first aftercooler 81A and the second aftercooler 84A is not limited to that in the above exemplary embodiment. For instance, the first aftercooler 81A may be disposed at the front-left side of the radiator 8A while the second aftercooler 84 may be disposed at the front-right side of the radiator 8A. Moreover, the inlet tanks 812 and 842 may be disposed at a bottom side while the outlet tanks 813 and 843 may be disposed at a top side.

The introduction elbow pipe 815 may be provided to the first introduction pipe 821 instead of the inlet tank 812.

The discharge elbow pipe 834 may be provided to the outlet tank 843 instead of the second discharge pipe 832.

The introduction pipe 82 and the discharge pipe 83 each are not necessarily provided by the plurality of connected pipes, but may be provided by a single pipe. The branch pipe 85 may be structured so that the introduction branch pipe 825 of the second introduction pipe 822 is directly connected to the second aftercooler 84.

The joint pipe 86 may be structured so that the discharge branch pipe 836 of the second discharge pipe 832 is directly connected to the second aftercooler 84.

The engine 7 may be any engines other than the diesel engine, but may be, for instance, a gasoline engine.

The supercharger is not limited to the exhaust turbocharger 71, but may be, for instance, a supercharger including a turbine driven by the engine 7.

The invention claimed is:

1. A cooling device comprising:
   an introduction pipe configured to introduce a charge air supercharged by a supercharger;
   a first aftercooler connected to the introduction pipe and configured to cool the charge air;
   a branch pipe branched from the introduction pipe;
   a second aftercooler connected to the branch pipe and configured to cool the charge air; and
   a cooling fan configured to supply a cooling wind to the first aftercooler and the second aftercooler, wherein
   the first aftercooler and the second aftercooler are disposed to be shifted from each other in a rotation axis direction of the cooling fan and in a direction perpendicular to the rotation axis direction and are disposed not to be overlapped with each other in the rotation axis direction of the cooling fan.

2. The cooling device according to claim 1, wherein
   the first aftercooler and the branch pipe are juxtaposed in the rotation axis direction of the cooling fan.

3. The cooling device according to claim 1, wherein
   the introduction pipe and the branch pipe are disposed at substantially the same height.

4. The cooling device according to claim 1, wherein
   the branch pipe comprises a straight pipe extending in a direction of introducing the charge air to the second aftercooler to be connected to the second aftercooler.

5. The cooling device according to claim 1, further comprising:
   a discharge pipe connected to the first aftercooler and configured to discharge the charge air from the first aftercooler; and
   a joint pipe connecting the second aftercooler to the discharge pipe.

6. The cooling device according to claim 5, wherein
   the discharge pipe and the second aftercooler are juxtaposed in the rotation axis direction of the cooling fan.

7. The cooling device according to claim 5, wherein
   the discharge pipe and the joint pipe are disposed at substantially the same height.

8. The cooling device according to claim 5, wherein
   the discharge pipe comprises a straight pipe extending in a direction of discharging the charge air from the first aftercooler.

9. The cooling device according to claim 1, wherein
   the first aftercooler and the second aftercooler respectively have ends of cores at the same line with reference to the rotation axis direction.

10. A cooling device comprising: a main pipe comprising an introduction pipe configured to introduce a charge air supercharged by a supercharger, a first aftercooler connected to the introduction pipe, and a discharge pipe configured to discharge the charge air from the first aftercooler;
    a branch pipe comprising a branch pipe branched from the introduction pipe, a second aftercooler connected to the branch pipe, and a joint pipe connecting the second aftercooler to the discharge pipe; and
    a cooling fan configured to supply a cooling wind to the first aftercooler and the second aftercooler, wherein
    the first aftercooler and the second aftercooler are disposed to be shifted from each other in a rotation axis direction of the cooling fan and in a direction perpendicular to the rotation axis direction and are disposed not to be overlapped with each other in the rotation axis direction of the cooling fan.

11. The cooling device according to claim 10, wherein
    the main pipe further comprises: a first T-pipe branched from the introduction pipe;
    a first elbow pipe configured to change a flow direction of the charge air from an introduction direction of the charge air by the introduction pipe to an introduction direction of the charge air by the first aftercooler;
    a second elbow pipe configured to change the flow direction of the charge air discharged from the first aftercooler from a discharge direction of the charge air by the first aftercooler to an opposite direction from the introduction direction by the introduction pipe; and
    a second T-pipe branched from the discharge pipe, wherein
    the branch pipe connects the first T-pipe to the second T-pipe.

12. A construction machine comprising:
    an engine; and
    the cooling device according to claim 1.

13. A construction machine comprising:
    an engine; and
    the cooling device according to claim 10.

* * * * *